United States Patent [19]

Pendell

[11] 4,024,593

[45] May 24, 1977

[54] METHOD OF FORMING FLAT MULTIPLE-SIDED FASTENER PARTS HAVING AN OPENING THEREIN

[76] Inventor: Larry Stuart Pendell, Rte. 8, Box 489, Elkhart, Ind. 46514

[22] Filed: May 19, 1976

[21] Appl. No.: 687,764

Related U.S. Application Data

[63] Continuation-in-part of Ser. No. 578,388, May 19, 1975, abandoned.

[52] U.S. Cl. .............................. 10/86 R; 10/86 B; 29/412; 83/42
[51] Int. Cl.[2] ................... B21D 53/20; B21D 53/24
[58] Field of Search ............ 10/73, 75, 86 R, 86 A, 10/86 B, 86 F; 29/412, 415, 417; 83/32, 405, 406; 85/32 R; 113/116 V, 116 Y, 116 BB

[56] References Cited

UNITED STATES PATENTS

| | | | |
|---|---|---|---|
| 1,303,371 | 5/1919 | Novick | 83/405 |
| 1,915,988 | 6/1933 | Frank | 29/417 |
| 2,335,292 | 11/1943 | Messenger | 29/412 |
| 2,343,253 | 3/1944 | Clark | 29/415 |
| 2,352,118 | 6/1944 | Poupitch | 10/86 B |
| 2,371,440 | 3/1945 | Hall | 10/86 R |
| 2,707,012 | 4/1955 | Cox | 10/86 B |
| 2,842,181 | 7/1958 | Machac | 10/86 B |

*Primary Examiner*—E. M. Combs
*Attorney, Agent, or Firm*—Oltsch & Knoblock

[57] ABSTRACT

A method of forming flat, multiple-sided fastener parts from an elongated strip of sheet material by causing the material to pass progressively through a work station where a series of longitudinally spaced openings are formed in the material and the material is periodically severed along an irregular line defining contiguous multiple sides of adjacent fastener parts for the purpose of separating individual fastener parts from such adjacent parts.

5 Claims, 17 Drawing Figures

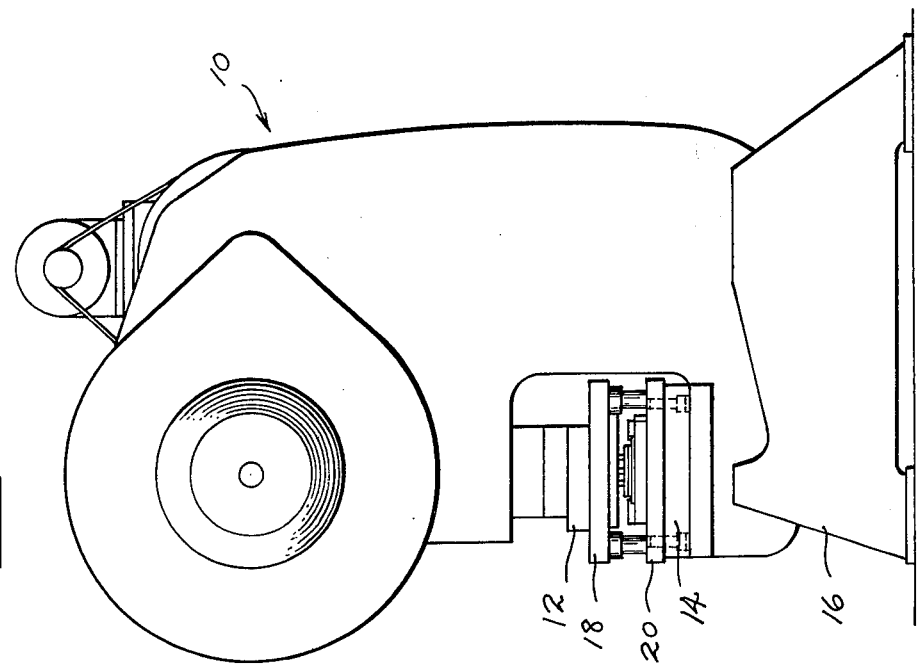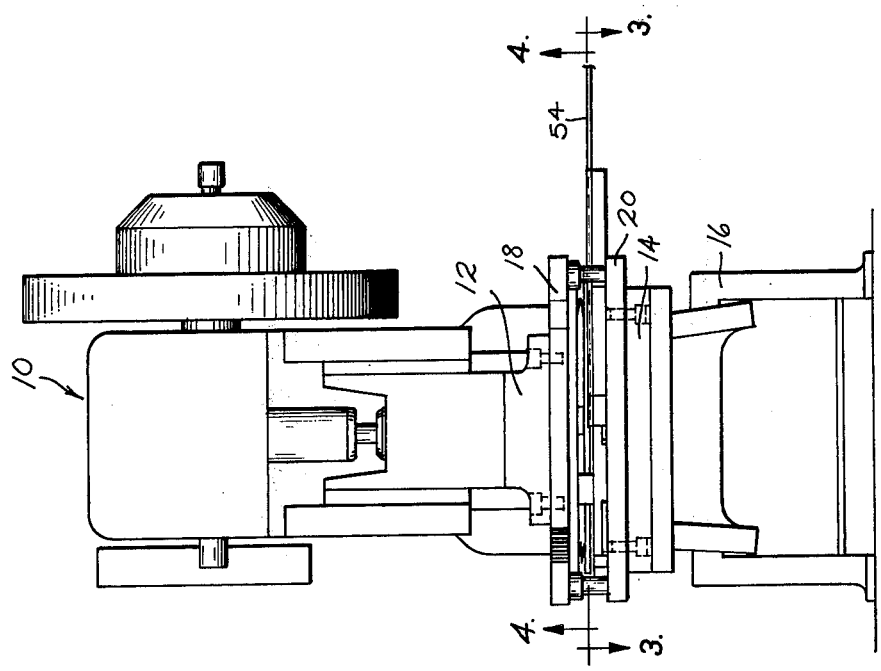

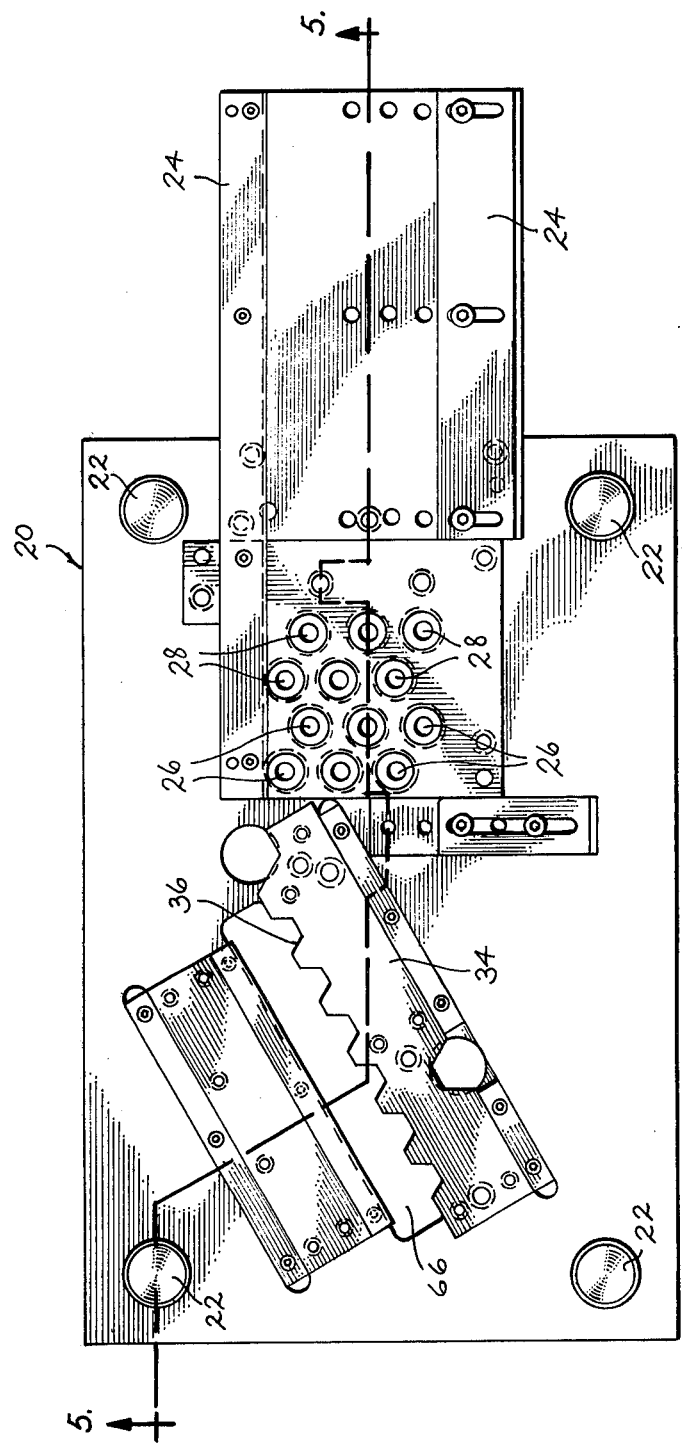

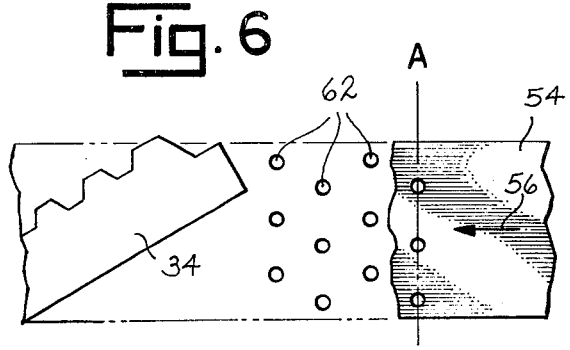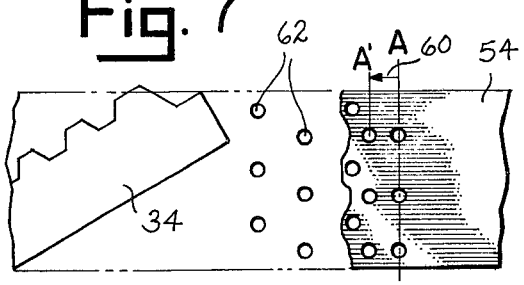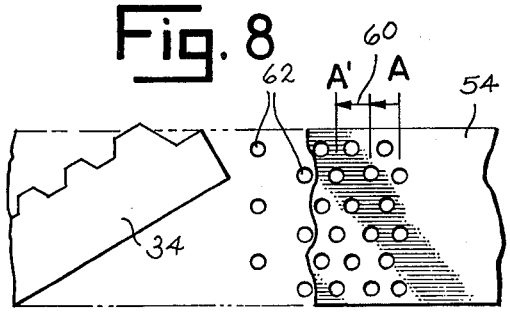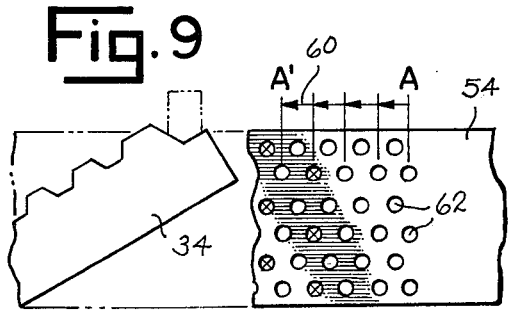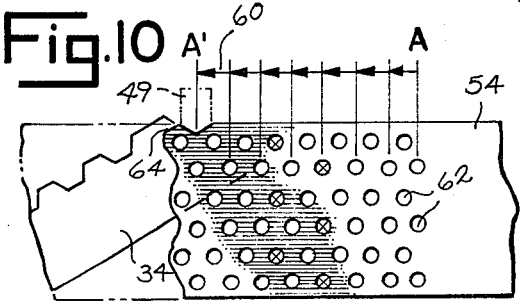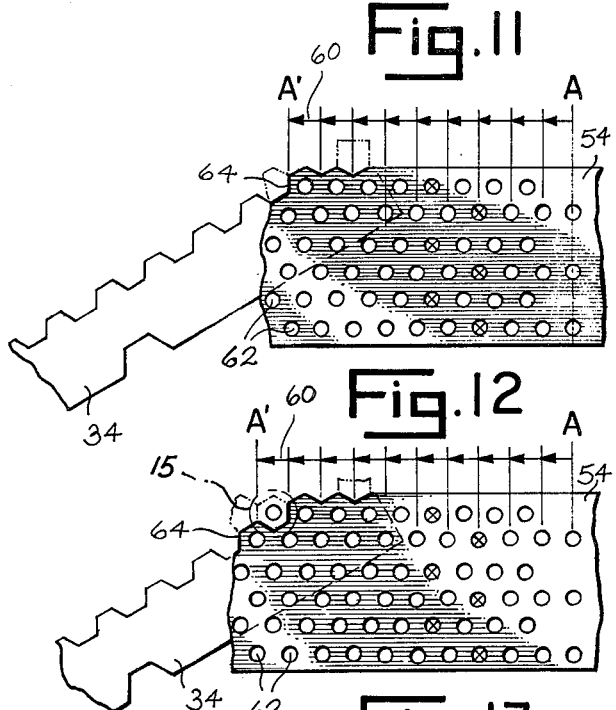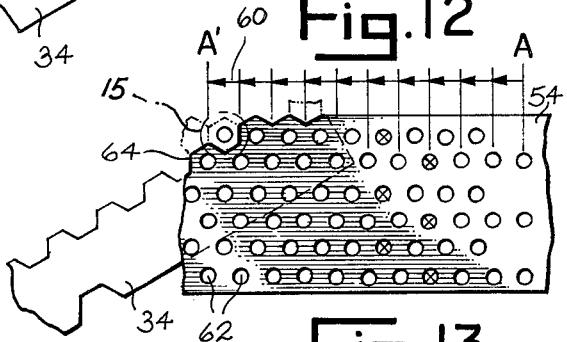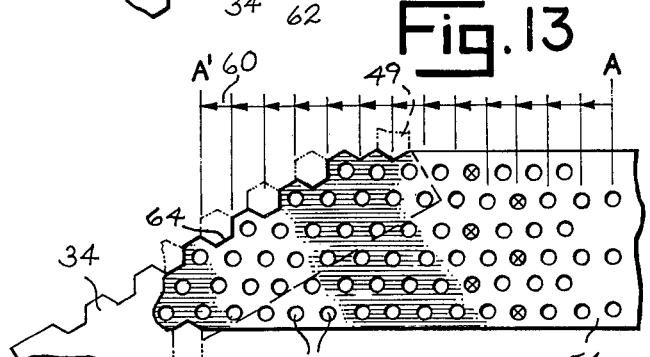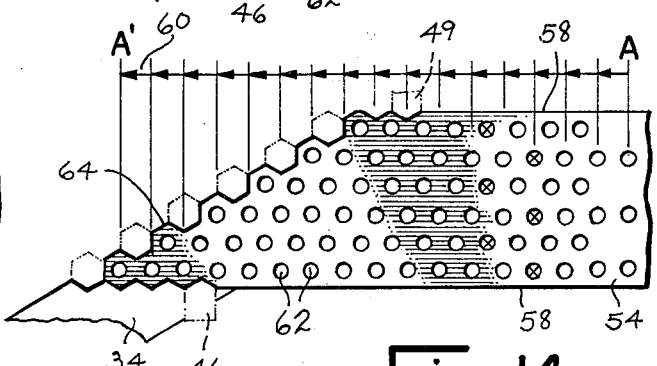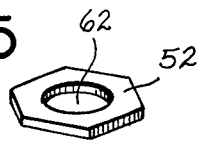

METHOD OF FORMING FLAT MULTIPLE-SIDED FASTENER PARTS HAVING AN OPENING THEREIN

CROSS REFERENCE TO RELATED APPLICATION

This is a contination-in-part of application Ser. No. 578,388, filed May 19, 1975 and now abandoned.

SUMMARY OF THE INVENTION

This invention relates to a method of forming flat, multiple-sided fastener parts, such as washers and nuts, having a center opening therein.

An elongated strip of sheet material is progressively fed through a work station where a series of longitudinally spaced openings are formed in the material. As the material passes through the work station it is severed from one side edge to the other side edge along an irregular line which defines contiguous multiple sides of adjacent fastener parts to separate individual fastener parts from such adjacent parts. In this manner as each fastener part is severed from the sheet material one or more side edges of other adjacent parts are formed in the sheet material, thereby reducing to a minimum the waste material produced in forming the fastener parts. By including a threading step in the process after the sheet material has been punched and before the individual fastener parts are severed from the material, nuts can be economically produced from the sheet material.

Accordingly, it is an object of this invention to provide a method of forming fastener parts having multiple sides and at least one opening therein.

It is another object of this invention to provide an economical method of forming washers.

Still another object of this invention is to provide an economical method of forming nuts.

Other objects of this invention will become apparent upon a reading of the invention's description.

BRIEF DESCRIPTION OF THE DRAWINGS

FIG. 1 is a perspective view of a press utilized to carry out the method of this invention.

FIG. 2 is a side elevational view of the press shown in FIG. 1.

FIG. 3 is a sectional view of the press showing the lower die thereof as seen along line 3—3 of FIG. 1.

FIG. 6–14 are sequential top plan views showing the strip of sheet material being formed in progressive steps into multiple-sided washers.

FIG. 15 is an isolated view of one multiple-sided washer formed as shown in FIGS. 6–14 and taken from encircled portion 15 of FIG. 12.

DESCRIPTION OF THE PREFERRED EMBODIMENTS

The preferred embodiments illustrated are not intended to be exhaustive or to limit the invention to the precise forms disclosed. They are chosen and described in order to best explain the principles of the invention and its application and practical use to thereby enable others skilled in the art to best utilize the invention.

Figure 4:
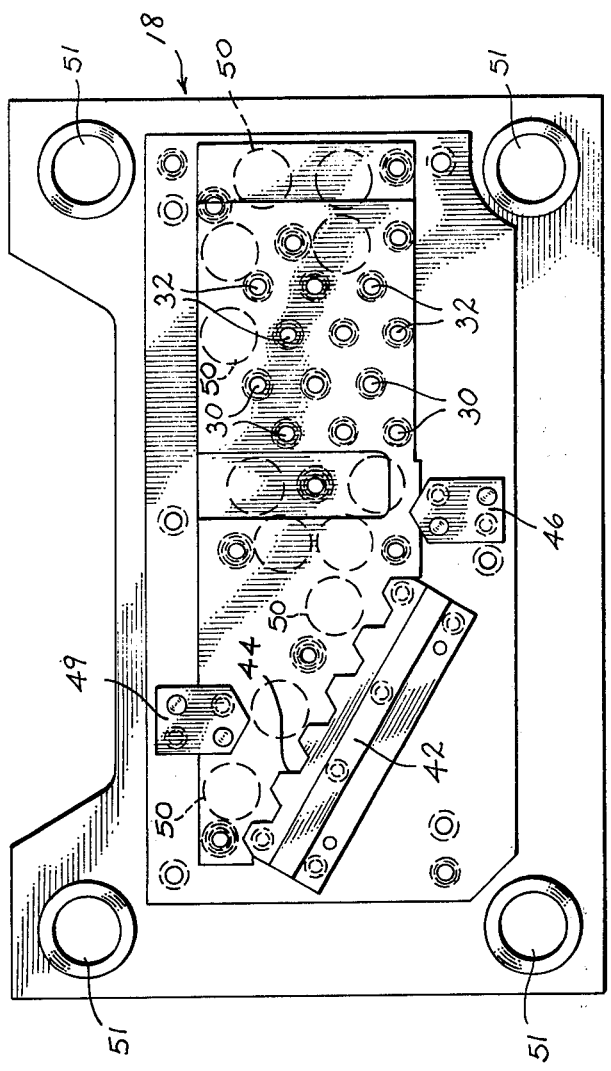
FIG. 4 is a sectional view of the press showing the upper die thereof as seen along line 4—4 of FIG. 1.

The apparatus for performing the method of this invention shown in FIGS. 1–15 includes a reciprocating press 10 which may be any one of a variety of commercially available constructions. Press 10 includes a reciprocating ram to which a slide 12 is connected and a bolster 14 which rests upon bed 16 of the press. Mounted to slide 12 is an upper die 18 and mounted to bolster 14 is a lower die 20. A detailed construction of dies 18 and 20 is best seen in FIGS. 3–5.

Lower die 20 includes upwardly projecting leader pins or guide posts 22 which are located one at each corner and spaced side guides 24 which are located on opposite sides of the material pass line through the press to direct the material across the lower die and over transversely aligned openings 26 and 28 in the die. Openings 26 serve as guides for the locating pins 30 in upper die 18 and openings 28 serve as relief bores for the punches 32 in the upper die. Forming a component of lower die 20 and mounted forwardly of openings 26 is a die part 34 having a diagonally extending irregularly shaped forward edge 36. The terms "forward," "rearward" and similar directional terms used in describing this invention have relationship to the travel of the sheet material through press 10 with the term "forward" referring to the direction of travel of the material along its pass line through the press and the term "rearward" having reference to the direction opposite to the direction of travel of the material through the press.

Upper die 18 includes a plurality of depending punches 32 and a plurality of depending locating pins 30 which are located forwardly of the punches. A knife part 42 is located forwardly of locating pins 30 and includes an irregularly shaped cutting edge 44 which conforms to the shape of edge 36 of die part 34 of the lower die. Additionally, a knife part 46 is located between knife part 42 and locating pins 30 at one side of the path or pass line through which the sheet material will pass under die 18. A second knife part 49 is located oppositely of knife part 42 at the other side of the material pass line under die 18. Knife parts 42, 46 and 49 all form components of the upper die.

Figure 5:
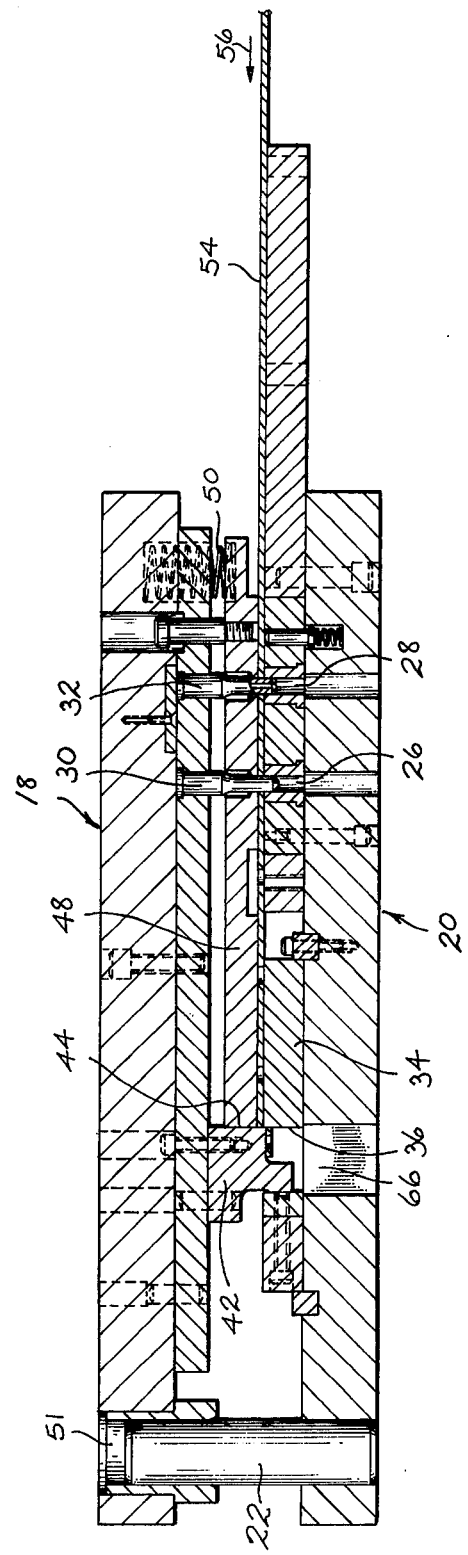
FIG. 5 is a sectional view taken along line 5—5 of FIG. 3 showing in section both the upper and lower dies utilized in the press of FIG. 1.

As die 18 is lowered into the position shown in FIG. 5 upon operation of press 10, locating pins 30 and punches 32 will enter openings 26 and 28 respectively in the lower die, and cutting edge 44 of knife part 46 will complementally pass in front of the irregularly shaped edge 36 of die part 34 in a shearing motion. Upper die 18 also carries a shiftable stripper plate 48 which upon expansion of springs 50 is urged away from the lower face of the upper die for the purpose of holding the sheet material against the upper face of lower die 20 as the punches 32 of the upper die and knife parts 42, 46 and 49 are withdrawn from the material upon a raising of press slide 12. Guided movement of upper die 18 relative to the lower die 20 is facilitated by having guide parts 22 journaled within guide bores 51 formed at the corners of the upper die.

The method of forming multiple-sided fastener parts, such as the washer 52 shown in FIG. 15, using the above described apparatus follows. An elongated piece of sheet material 54, which is generally of a rolled steel composition but which may be of plastic, rubber or other materials, is fed by a suitable commercially available feed mechanism progressively in incremental movements through press 10, between upper die 18 and lower die 20. This movement of sheet material 54 is indicated by arrow 56 in FIGS. 5 and 6. An illustration of the progressive advancement of sheet material 54 and the formation of washers 52 is seen in FIGS. 6–14 which are numbered in sequential order. To assist in understanding the method of this invention a reference line A is shown in each of the FIGS. 6–14 with each incremental advancement of material 54 in the direction of arrow 56 being indicated by a shorter arrow 60 and the distance A'. As material 54 passes through press 10 between guides 24 and over openings 26 and 28 in lower die 20, openings 62 are formed by punches 32 in the material as shown in FIG. 5 and FIGS. 6–8. As the material having openings 62 formed in it passes over die part 34 in lower die 20, an irregularly shaped cut 64 is formed diagonally across the material (FIGS. 10–14) with the side edges being simultaneously notched in a V-shaped configuration by knife parts 46 and 49 (FIG. 13).

Thus, as material 54 is fed through press 10 knife part 42 in upper die 18 serves in severing the material to form a plurality of individual washers 52 which fall through longitudinal opening 66 in lower die 20 into a suitable depository. It is important to note that as individual washers are severed from the sheet material, multiple sides of the next to be severed washers are simultaneously formed. Each cut of knife part 42 is made along contiguous multiplesides of adjacent washers 52, thereby substantially reducing waste scrap material formed during the severing operation of the washers. In the method of this invention, the only waste material created will be the punched out centers of the washers and the V-shaped scrap parts from the side edges 58 of the sheet material 54 formed by knife parts 46 and 49.

While knife part 42 and cooperating die part 34 are shown to form a continuous irregular diagonal cut across sheet material 54, it is to be understood that the irregular cutting lines from one side edge to the other side edge of the material to form the contiguous multiple sides of adjacent washers 52 or other similar fastener parts could also be formed by utilizing a plurality of individual knives spaced apart in front of the punches and locating pins to form the fastener part sides, or by providing the upper die with the punches and the lower die with selectively spaced individual knife parts. Additionally, the flat washers 52 formed by the above described method may also be of the spring type flat washer or a conical-shaped washer.

Figure 16:
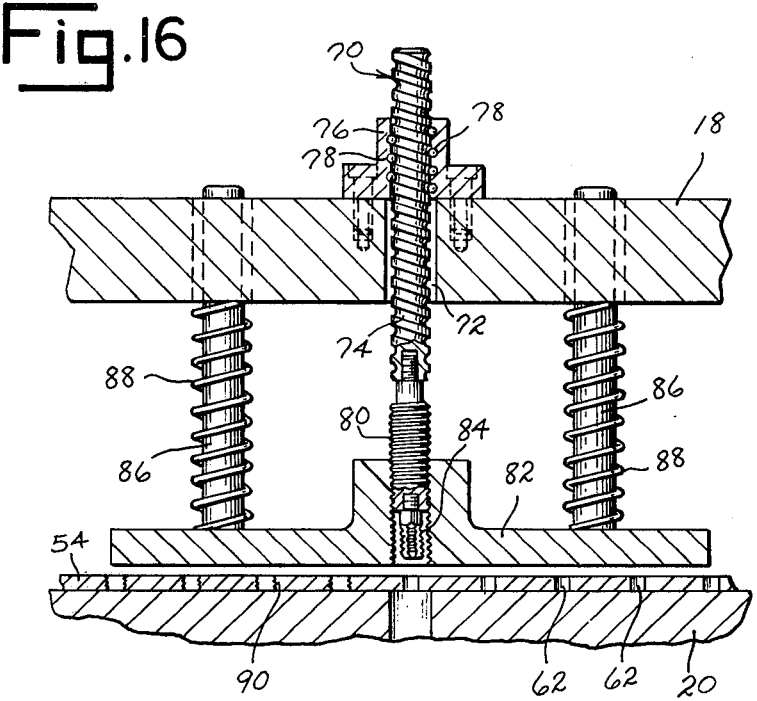
FIG. 16 is a fragmentary sectional view of the dies of the press shown in modified from and including tapping means by which nuts may be formed according to the method of this invention.
Figure 17:
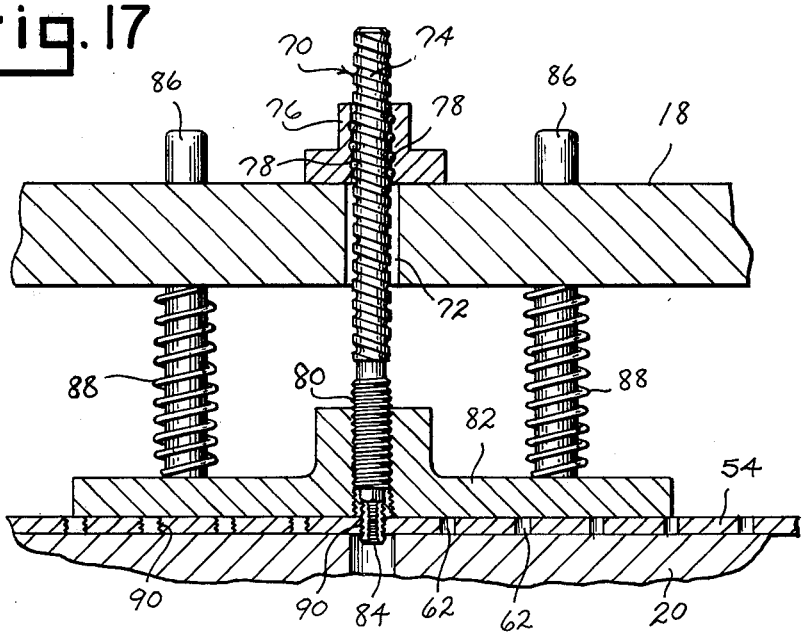
FIG. 17 is a fragmentary sectional view of the modified dies as seen in FIG. 16 showing the threading operation.

In FIGS. 16 and 17 the upper die 18 of press 10 is provided with a threading component for forming nuts by the above described method. Upper die 18 is expanded to accommodate a plurality (only one shown) of selectively spaced drill shanks 70. Each shank 70 extends through an opening 72 in die 18 and is formed with a helical groove 74. A mount 76 is secured to die 18 and is provided with a plurality of rotatable spherical members 78. Shank 70 extends through mount 76 with spherical members 78 fitting within groove 74 of the shank. This arrangement forms a ball bearing screw which upon the application of an axially directed force to shank 70 allows the shank to rotate and shift axially relative to die 18.

The lower end 80 of shank 70 is threaded and turned into an individual stripper plate 82. A tap 84 is secured to shank end 80 in axial alignment with the shank. Tap 84 extends with clearance through stripper plate 82. Guide posts 86 project upwardly from stripper plate 82 into guide bores in die 18. A helical spring 88 surrounds each guide post 86 and is compressed between the stripper plate and die.

The threading component of FIGS. 16 and 17 with its multiple shanks 70 is located along the pass line of material 54 between locating pins 30 and knife part 42. As sheet material 54 with its punch formed openings 62 therein passes under shanks 70, upper die 18 is lowered as part of its cyclic movement causing stripper plate 82 to contact the sheet material and an axial force to be applied to each shank 70. This force causes the shanks to rotate and shift downwardly relative to the die and stripper plate with tap 84 of each shank entering an opening 62 in the sheet material to form an internal thread 90 in the sheet material about the opening. Upon the raising of upper die 18, shanks 70 are reverse rotated to withdraw each tap 84 from the sheet material with stripper plate 82 contacting the material. During the threading operation, knife part 42 severs the sheet material having threaded openings 62 already formed in it to form individual nuts.

As best seen in FIG. 3, one of the spaced guides 24 is adjustable so as to accommodate sheet material of various widths. By extending the width of lower die 20 where it supports guides 24 the guides may be spaced sufficiently apart so as to permit double width material to be padded through the press causing one-half of the material to be cut into washers or nuts. The remaining half of the material which has an irregular side edge due to the forming of the washers or nuts in the other half of the material can be recoiled and then passed again through the press under punches 32 and knife part 42 with side guides 24 being reset to accommodate the narrow width material. The irregular precut side of the reinserted material is caused to coincide with the pattern formed by the punching and cutting dies so that the precut side edge forms two of the sides of the washers or nuts formed from the material. In this manner, by utilizing double width material, material waste along the side edges is further minimized.

It is to be understood that the above described invention is not to be limited to the details above given but that it may be modified within the scope of the appended claims.

What is claimed is:

1. A method of forming flat hexagon-shaped individual fastener parts each having an opening therein from an elongated strip of sheet material comprising the steps of:

a. causing said material to pass progressively through a work station;

b. first forming a series of longitudinally spaced openings in the material as it passes through said work station, and then c. periodically severing said material as the material passes through said work station from one side edge to the other side edge of the material in one cutting operation along an irregular cutting line defining contiguous multiple sides of adjacent fastener parts to separate individual fastener parts from said adjacent parts, at least one of said individual fastener parts being separated along said cutting line from such adjacent parts along three of its adjoining sides.

2. The method of claim 1 wherein the step of severing said material includes cutting said material diagonally along a saw-tooth line.

3. The method of claim 1 wherein the step of forming said openings in the material and the step of severing said material into separate fastener parts are simultaneous.

4. The method of claim 1 and including the step of threading said openings in said sheet material prior to severing said material into individual fastener parts to form nut type fastener parts.

5. The method of claim 1 wherein step (c) includes separating three or more individual fastener parts from said adjacent parts with all but one of said individual fastener parts each being separated along said cutting line from such adjacent parts along three of its adjoining said sides.

* * * * *